Sept. 16, 1941.                A. R. SMITH                2,256,221
                    ELASTIC FLUID TURBINE CASING
                        Filed March 18, 1938
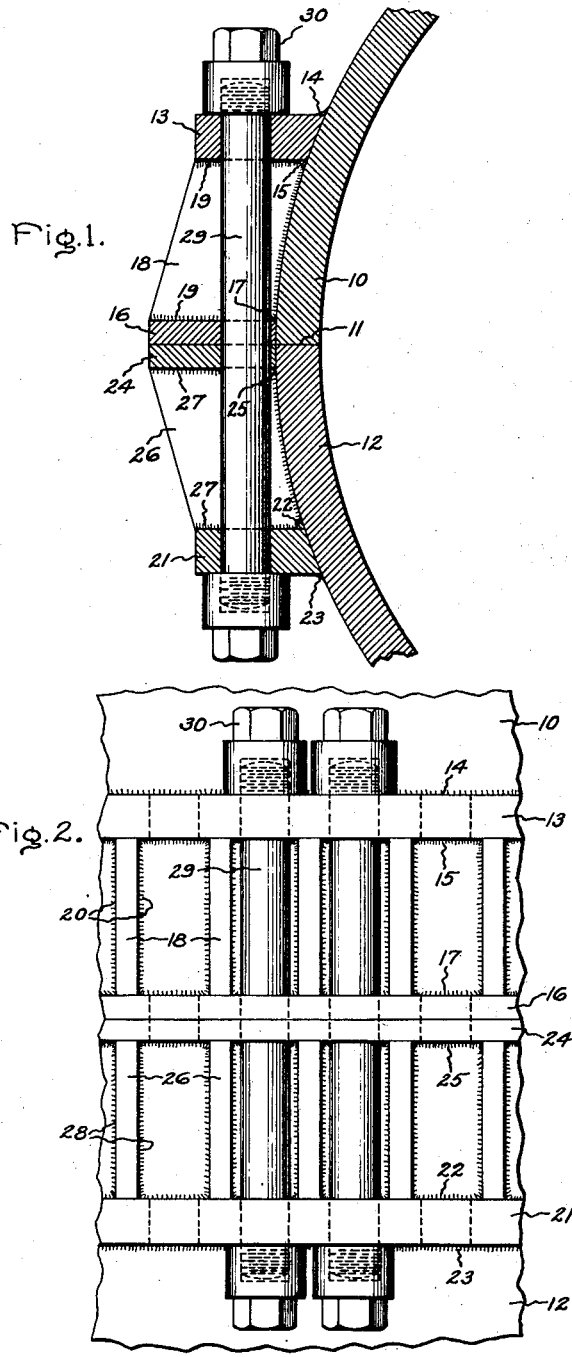
Inventor:
Arthur R. Smith,
by Harry E. Dunham
His Attorney.

Patented Sept. 16, 1941

2,256,221

UNITED STATES PATENT OFFICE 2,256,221

ELASTIC FLUID TURBINE CASING

Arthur R. Smith, Schenectady, N. Y., assignor to General Electric Company, a corporation of New York Application March 18, 1938, Serial No. 196,709

2 Claims. (Cl. 189—36)

The present invention relates to elastic fluid turbine casings and more specifically to fabricated flanged casings subject to high stresses during operation.

The object of the invention is to provide an improved arrangement of fabricated flanged casing structures which may be safely subjected to pressures and temperatures prevailing in the operation of modern high pressure, high temperature elastic fluid turbines.

For a consideration of what I believe to be novel and my invention, attention is directed to the following description and the claims appended thereto in connection with the accompanying drawing.

In the drawing, Fig. 1 illustrates a sectional view of an elastic fluid turbine casing structure embodying my invention, and Fig. 2 is a side view thereof.

The arrangement comprises an upper casing 10 with a face 11 engaging the face of a lower casing 12. The two casings are flanged and rigidly secured together. To this end the upper casing 10 is provided with an outer flange 13 secured to the casing by welds 14, 15 and an inner flange 16 secured to the casing 10 by a weld 17. The inner flange 16 is provided near the face 11 and has a surface which forms a smooth continuation of said face. The outer flange 13 is considerably spaced from the end face 11, that is, the flange 13 is secured to a portion of the turbine casing circumferentially spaced from the portion which is to form a joint with the lower casing. The outer and inner flanges 13 and 16 respectively are in addition connected together and to the casing 10 by ribs or braces 18 by means of welds 19 and 20. Similarly, the lower casing half 12 has an outer flange 21 corresponding to the flange 13 and secured to the casing 12 by welds 22 and 23. An inner flange 24 is secured to the casing 12 by a weld 25. This flange forms a smooth continuation of the end face of the lower casing 12 and when assembled engages the flange 16 to form a joint therewith. The flanges 21 and 24 are connected by ribs or braces 26 welded thereto and to the casing 12 by welds 27 and 28. The flanges of the two casings are tightly secured together by means of bolts 29 with nuts 30. The bolts 29 project through openings in the inner and outer flanges. The openings in the inner flanges are provided as close as possible to the outer surface of the casings so that the holding force of the bolts is supplied to the casing in a line substantially tangent to the line of juncture of the two halves. With such an arrangement the spacing of the centerlines of the bolts from corresponding tangents to the line of juncture of the two casing halves is substantially equal to the length of the radii of the bolts.

With my invention I have accomplished an improved fabricated flanged structure which may be manufactured at comparatively low cost. The flange structure is comparatively light in weight and permits quick heat flow which is important during starting of a turbine because it reduces stresses and the consequent creeping of the material. In certain arrangements the inner flanges may be omitted, in which case the braces serve as an additional support of the flanges on the casing wall.

What I claim as new and desire to secure by Letters Patent of the United States, is:

1. A substantially cylindrically-shaped fabricated elastic fluid turbine casing having two halves with faces engaging each other near a plane through the axis of the cylindrical casing, and means securing the two halves together comprising a flange with a row of openings for each half welded to a portion thereof circumferentially spaced from its face, and a plurality of bolts projecting through the openings for securing the halves together, intermediate portions of the bolts being so closely spaced with the adjacent surfaces of the cylindrical casing that the holding force of the bolts is applied to the casing in a line substantially tangent to the line of juncture of the two halves.

2. A substantially cylindrically-shaped fabricated elastic fluid turbine casing having two halves with faces engaging each other in a plane through the axis of the cylindrical casing, and means securing the two halves together comprising a flange structure for each half, each flange structure including a flange fused to a casing half adjacent the joint of the halves, another flange fused to the same casing half and circumferentially spaced from the first flange and webs connecting the two flanges, the two flanges having each a plurality of bores, and a plurality of bolts projecting through the bores of the flanges of the two flange structures, the spacing of the center lines of the bolts from corresponding tangents to the line of juncture of the two casing halves being substantially equal to the length of the radii of the bolts.

ARTHUR R. SMITH.